(12) United States Patent
Rausch

(10) Patent No.: US 8,250,248 B2
(45) Date of Patent: Aug. 21, 2012

(54) WAKE-AHEAD BASED ON PATTERNS

(75) Inventor: Gerd Rausch, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/152,075

(22) Filed: Jun. 2, 2011

(65) Prior Publication Data

US 2011/0238907 A1    Sep. 29, 2011

Related U.S. Application Data

(63) Continuation of application No. 11/869,895, filed on Oct. 10, 2007, now Pat. No. 7,979,598.

(51) Int. Cl.
*G06F 3/00* (2006.01)
(52) U.S. Cl. ............................................ 710/15; 710/18
(58) Field of Classification Search .................. 710/15, 710/18
See application file for complete search history.

(56) References Cited

U.S. PATENT DOCUMENTS

| 5,481,733 | A | 1/1996 | Douglis et al. |
| 6,262,545 | B1 | 7/2001 | Yamamoto |
| 7,369,981 | B1 | 5/2008 | Saghier et al. |
| 7,425,810 | B2 | 9/2008 | Hobbet et al. |
| 2006/0143419 | A1 | 6/2006 | Tulyani |

OTHER PUBLICATIONS

Co-pending U.S. Appl. No. 11/869,895, filed Oct. 10, 2007 entitled "Wake-Ahead Based on Patterns" by Gerd Rausch, 33 pages.

*Primary Examiner* — Chun-Kuan Lee
*Assistant Examiner* — David Martinez
(74) *Attorney, Agent, or Firm* — Harrity & Harrity, LLP

(57) ABSTRACT

A method may include detecting an event, determining whether the event correlates to a hard disk access, requesting a wake-ahead of a hard disk drive if it is determined that the event correlates to a hard disk access, weighing a performance improvement of the hard disk drive if the wake ahead request is granted against a life of the hard disk drive if the wake ahead request is not granted, and waking ahead the hard disk drive if the performance improvement outweighs the life of the hard disk drive.

19 Claims, 8 Drawing Sheets

WAKE-AHEAD BASED ON PATTERNS

RELATED APPLICATION

This application is a continuation of U.S. patent application Ser. No. 11/869,895, filed Oct. 10, 2007, which is incorporated herein by reference.

BACKGROUND

Numerous devices employ a hard disk drive (HDD). These types of devices may include one or more operational modes that may be triggered based on various conditions, such as device activity or device inactivity. In some instances, the HDD may be in a spin-down state. Thereafter, the HDD may awaken based on an access request. However, before the HDD can return to active operation and service the access request, the HDD must spin-up. In this regard, the time to spin-up the HDD results in latency and sub-optimal performance. Read-ahead operations may be utilized to minimize the response time of the HDD; however, the spin-up time still exists and does not begin until after the access request is received.

SUMMARY

According to one aspect, a method may include detecting an event, determining whether the event correlates to a hard disk access, requesting a wake-ahead of a hard disk drive if it is determined that the event correlates to a hard disk access, weighing a performance improvement if the wake ahead request is granted against a life of the hard disk drive if the wake ahead request is not granted, and waking ahead the hard disk drive if the performance improvement outweighs the life of the hard disk drive.

According to another aspect, a device may include, a memory containing instructions and a processor that may execute the instructions. The processor may execute instructions to detect an event, request a predictive hard disk drive operation if it is determined that the event correlates to a hard disk drive operation, weigh a performance improvement if the predictive hard disk drive request is granted, and operate the hard disk drive in accordance with the predictive hard disk drive request if the performance improvement meets a threshold value.

According to still another aspect, a computer-readable memory device may have instructions that may be executable by at least one processor. The computer-readable memory device may include instructions for detecting an event, instructions for determining whether the event is associated with a hard disk drive operation, instructions for requesting a predictive hard disk drive operation if it is determined that the event may be associated with the hard disk drive operation, instructions for weighing a performance improvement of the hard disk drive if the predictive hard disk drive request is granted, and instructions for not performing the predictive hard disk drive request based on the performance improvement.

According to yet another aspect, a device may include means for requesting a predictive hard disk drive operation based on an activity profile of the hard disk drive, means for weighing a performance improvement associated with the hard disk drive if the predictive hard disk drive request is granted against a parameter associated with the hard disk drive if the predictive hard disk drive request is not granted, means for bypassing the predictive hard disk drive request if the parameter associated with the hard disk drive outweighs the performance improvement, and means for operating the hard disk drive in accordance with the predictive hard disk drive request if the performance improvement outweighs the parameter associated with the hard disk drive.

BRIEF DESCRIPTION OF THE DRAWINGS

The accompanying drawings, which are incorporated in and constitute a part of this specification, illustrate one or more embodiments described herein and, together with the description, explain aspects of the invention. In the drawings.

DETAILED DESCRIPTION

The following detailed description refers to the accompanying drawings. The same reference numbers in different drawings may identify the same or similar elements. The term "HDD," as used herein, is intended to be broadly interpreted to include magnetic disk units, optical storage units, magneto-optical disk units, mobile HDDs, and other storage units that may employ a rotary recording medium for reading and/or writing thereto.

Figure 1:
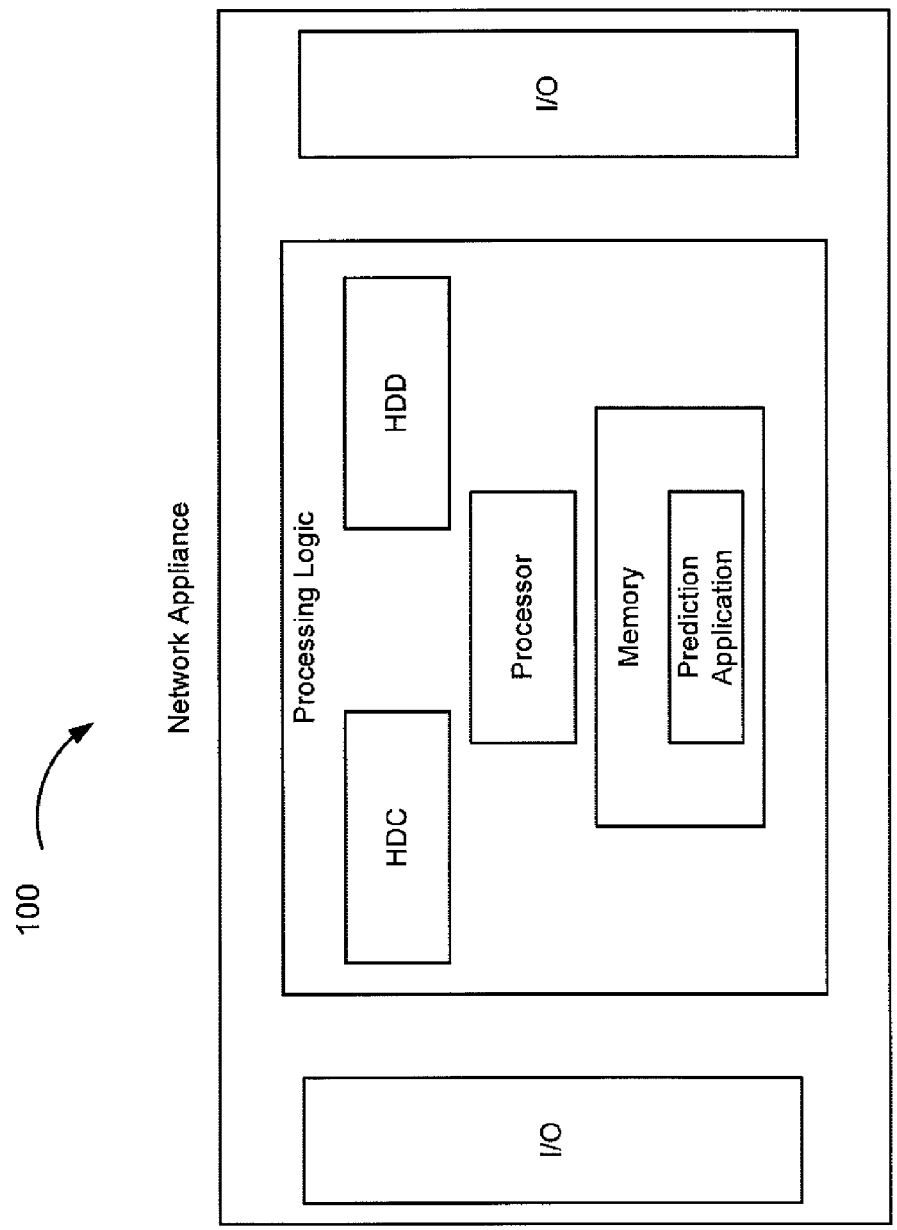
FIG. 1 is a diagram illustrating concepts described herein.

FIG. 1 is a diagram illustrating a system in which concepts described herein may be implemented. As illustrated, system 100 may be a network appliance, such as a router, and may include input/output (I/O) interfaces and/or processing logic. The processing logic may include a HDD, a hard drive controller (HDC), a processor, and/or a memory. The memory may include a prediction application. The prediction application may forecast access and/or non-access of the HDD based on previous HDD behavior.

In some instances, if the HDD is in a spin-down state, the prediction application may forecast when the HDD may wake-up based on previous access patterns. For example, the prediction application may cause the HDD to spin-up before access may be requested. Thus, the HDD may be in a spin-up state before or at the time of an access request so that latency associated with spin-up time may be significantly diminished and/or eliminated. In other instances, if the HDD is in a spin-up state, the prediction application may cause the HDD to continue spinning or spin down. For example, the prediction application may forecast that a time frame for a subsequent disk access may warrant continuous spinning of the HDD or that a time frame for a subsequent disk access may not warrant continuous spinning of the HDD.

In addition to the predictive capabilities of the prediction application, the prediction application may consider not only performance issues, but other issues as well. For example, the prediction application may consider the life of the HDD. Accordingly, the prediction application may not always, for example, pre-spin the HDD, since there may be some instances in which the life of the HDD may outweigh the performance improvement.

As a result of the foregoing, a device including a HDD and employing the concepts described herein may exhibit significant improvement in performance and life.

Exemplary Environment

Figure 2:
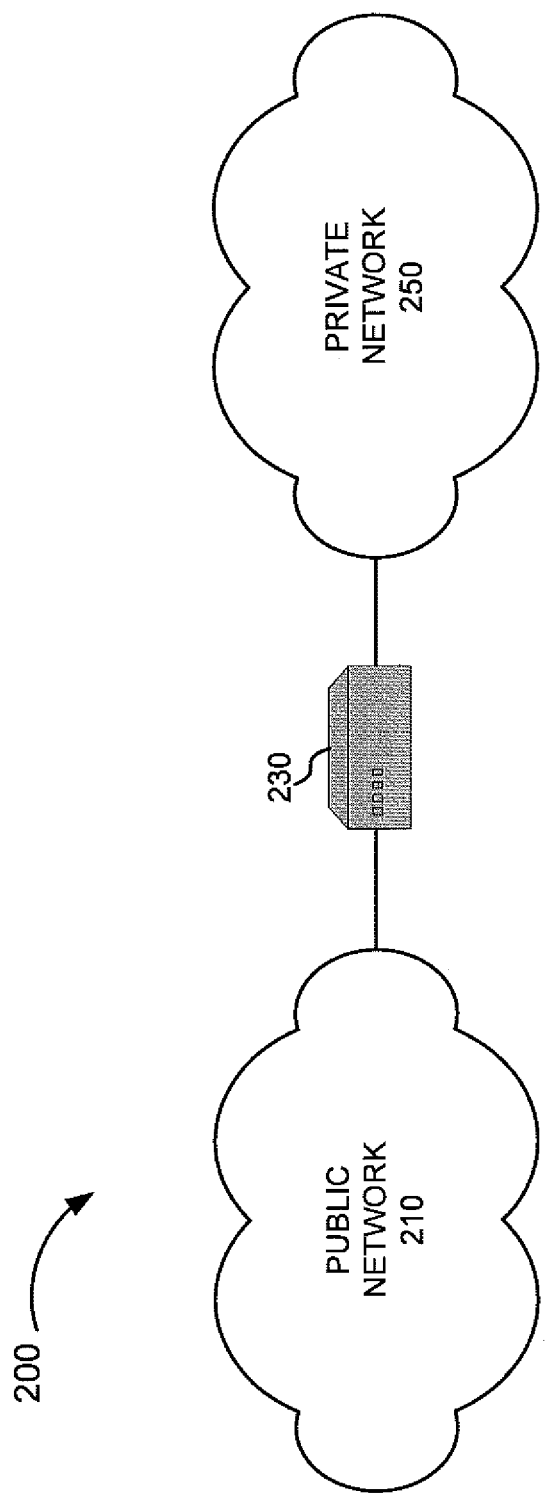
FIG. 2 is a diagram illustrating an exemplary environment in which concepts described herein may be implemented.

FIG. 2 is a diagram illustrating an exemplary environment in which concepts described herein may be implemented. As illustrated, environment 200 may include a public network 210, an appliance 230, and a private network 250. The connections of environment 200 may be, for example, wired and/or wireless, and the connections may be direct and/or indirect.

Public network 210 may include, for example, the Internet, an Intranet, a local area network (LAN), a wide area network (WAN), a wireless network, a telephone network (e.g., a Public Switched Telephone Network (PSTN)), any other type of network, or a combination of networks. Public network 210 may include client computing stations (not shown), such as computing devices of end-users.

Appliance 230 may include any network device that includes a HDD. For example, appliance 230 may include a router, a switch, a repeater, a hub, a gateway, a bridge, a server or a network security device, such as a firewall or intrusion detection system.

Private network 250 may include, for example, an Intranet, a local area network (LAN), any other type of network, or a combination of networks. Private network 250 may include client computing stations (not shown), such as computing devices of end-users.

Although FIG. 2 illustrates an exemplary environment, in other implementations, environment 200 may include fewer, additional, or different devices. For example, appliance 230 may not be a network device. Rather, appliance 230 may be any device that includes a HDD. Additionally, or alternatively, environment 200 may not include public network 210 and/or private network 250.

Exemplary Device

Figure 3:
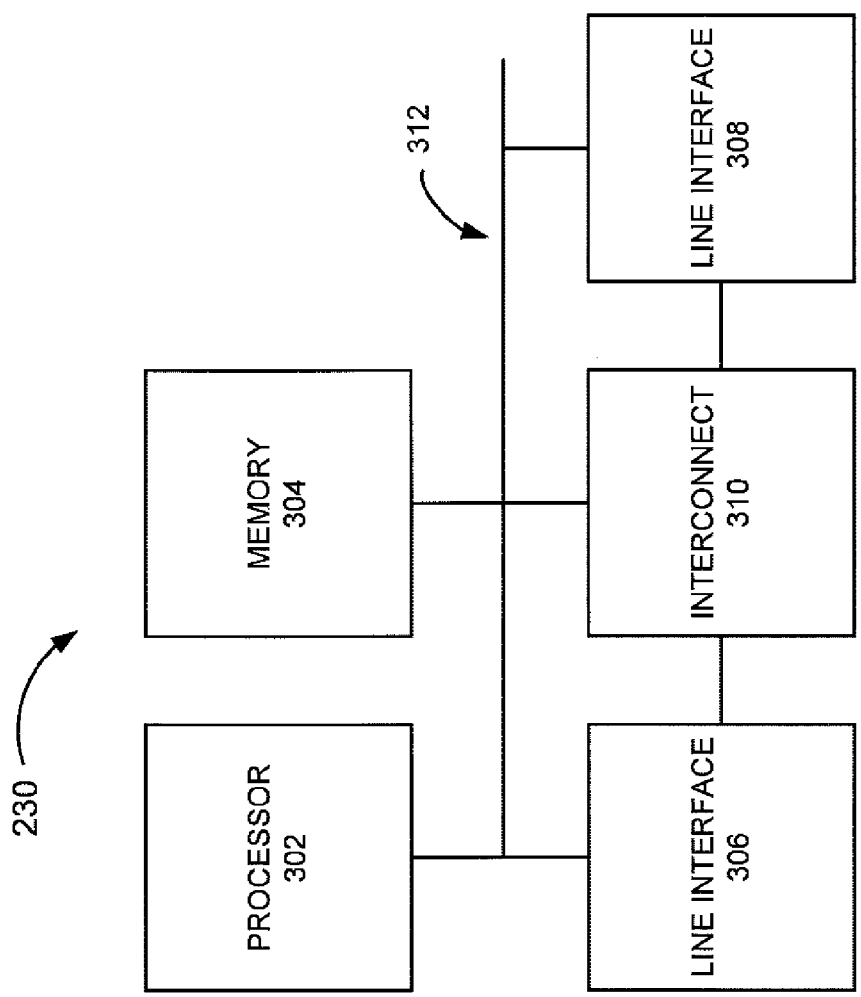
FIG. 3 is a diagram illustrating exemplary components of a device that may correspond to the appliance depicted in FIG. 2.

FIG. 3 is a diagram illustrating exemplary components of a device that may correspond to the appliance depicted in FIG. 2. The term "component," as used herein, is intended to be broadly interpreted to include hardware, software, and/or a combination of hardware and software. As illustrated, appliance 230 may include a processor 302, a memory 304, a line interface 306, a line interface 308, an interconnect 310, and a bus 312.

Processor 302 may include one or more processors, microprocessors, controllers, general purpose processors, ASIC, field programmable gate arrays (FPGAs), discrete gates or transistor logic, discrete hardware components, and/or processing components that may interpret and execute instructions. Memory 304 may include static memory, such as read only memory (ROM), dynamic memory, such as random access memory (RAM), registers, and/or onboard cache, for storing data and machine-readable instructions. Additionally, or alternatively, memory 304 may include a storage device, such as a HDD, as described in detail below, a floppy disk, a compact disc (CD) ROM, a CD read/write (R/W) disc, and corresponding drives, and/or a flash memory, as well as other types of storage devices. Alternatively, the HDD or other memory devices may be external to memory 304, as described in detail with respect to FIG. 4.

Line interfaces 306 and 308 may include a device for receiving incoming packets from a network and forwarding outgoing packets to a network, such as public network 210, and/or private network 250. For example, line interface 306 and/or line interface 308 may include a network interface card (NIC), a communication port, an Institute of Electrical and Electronics Engineers (IEEE) 1394 firewire compatible connection, an infrared interface, a Personal Computer Memory Card International Association (PCMCIA) card, etc. Line interfaces 306 and 308 may include an application-specific integrated circuit (ASIC) and/or other types of hardware and/or software.

Line interfaces 306 and 308 may implement industry promulgated protocol standards, such as transmission control protocol/Internet protocol (TCP/IP), asynchronous transfer mode (ATM), digital subscriber line (DSL), integrated services network (ISDN), fiber channel, synchronous optical network (SONET), Ethernet IEEE 802 standards, etc. Additionally, or alternatively, line interfaces 306 and 308 may implement non-standard, proprietary, and/or customized interface protocols. Line interfaces 306 and 308 may each contain a plurality of line interfaces to handle multiple traffic flows.

Interconnect 310 may include a switch or connection for conveying an incoming data packet or unit from line interface 306 to line interface 308 based on a data unit destination and stored path information. For example, interconnect 310 may include a communication bus or a switching fabric. Bus 312 may include a path that permits communication among the components of appliance 230. For example, bus 312 may include a system bus, an address bus, etc.

Appliance 230 may perform certain operations, as described in detail below. Appliance 230 may perform these operations in response to processor 302 executing software instructions contained in a computer-readable medium, such as memory 304. A computer-readable medium may be defined as a physical or logical memory device. The software instructions may be read into memory 304 from another computer-readable medium, such as from another device via line interfaces 306 and/or 308. The software instructions contained in memory 304 may cause processor 302 to perform processes that will be described later. Alternatively, hardwired circuitry may be used in place of or in combination with software instructions to implement processes as described herein. Thus, implementations described herein are not limited to any specific combination of hardware circuitry and software.

Although FIG. 3 illustrates exemplary components of appliance 230, in other implementations fewer, additional, or different components may be utilized. For example, appliance 230 may include a display or another type of input/output device. Additionally, or alternatively, functionalities of some components of appliance 230 may be incorporated into other components of appliance 230. For example, part of processor 302 and/or part of memory 304 may be included in line interfaces 306, 308, and/or part of memory 304 may be included in processor 302. Further, in other implementations, the configuration of the components, as depicted in FIG. 3, may be different.

Figure 4:
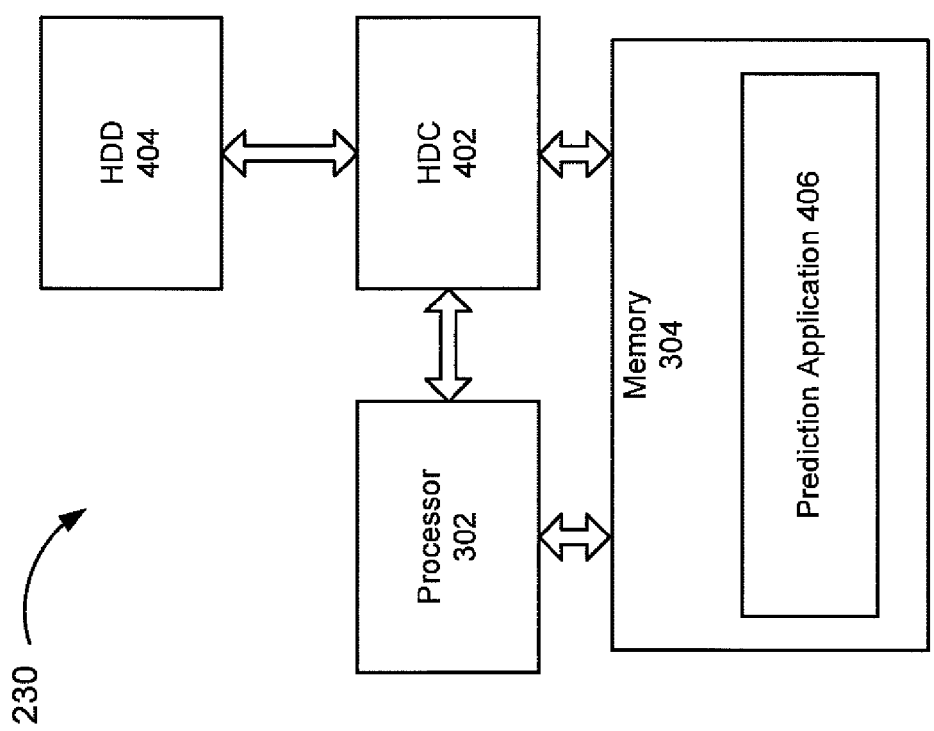
FIG. 4 is a diagram of an exemplary HDD system for the appliance depicted in FIG. 2.

FIG. 4 is a diagram of an exemplary HDD system for the appliance depicted in FIG. 2. In addition to the components previously described with respect to FIG. 3, appliance 230 may include a hard drive controller (HDC) 402, a HDD 404, and prediction application 406.

HDC 402 may include an interface that allows processor 302 to interface with HDD 404. In one implementation HDC 402 may include a controller card. In another implementation, HDC 402 may be integrated into HDD 404. HDD 404 may include a disk drive and one or more disks. The disk drive may be, for example, a contact start/stop (CSS) type or a ramp load/unload (L/UL) type disk drive. The disk(s) may be flat and/or circular. Depending on the type of disk, the disk may include, for example, a layer of magnetic material (e.g., a magnetic disk medium), a reflective layer, such as aluminum coated in lacquer (e.g., an optical disk), or a ferromagnetic material sealed in a plastic coating (e.g., a magneto-optical disk). The size and the number of disks may vary depending on the form factor of HDD 404 and/or appliance 230.

HDD 404 may also include a head, a spindle, a spindle motor, a spindle driver, an actuator, an actuator arm, and/or an actuator axis (not illustrated). The head may be a read/write head suitable for the type of disk of HDD 404. For example, HDD 404 having a magnetic disk may employ, for example, a magnetoresistive (MR) head or a giant MR (GMR) head. The disks may be mounted on the spindle. The spindle, the spindle motor and the spindle driver may turn the disk(s) which may allow HDD 404 to operate. The actuator, actuator arm, and/or actuator axis may position the head relative to the disk.

Although FIG. 4 illustrates exemplary components of appliance 230, in other implementations fewer, additional, or different components may be utilized. For example, HDD 404 may include a servo controller, a pre-amplifier, read/write channel circuitry, and/or other components that provide for the functionality described herein.

Figure 5:
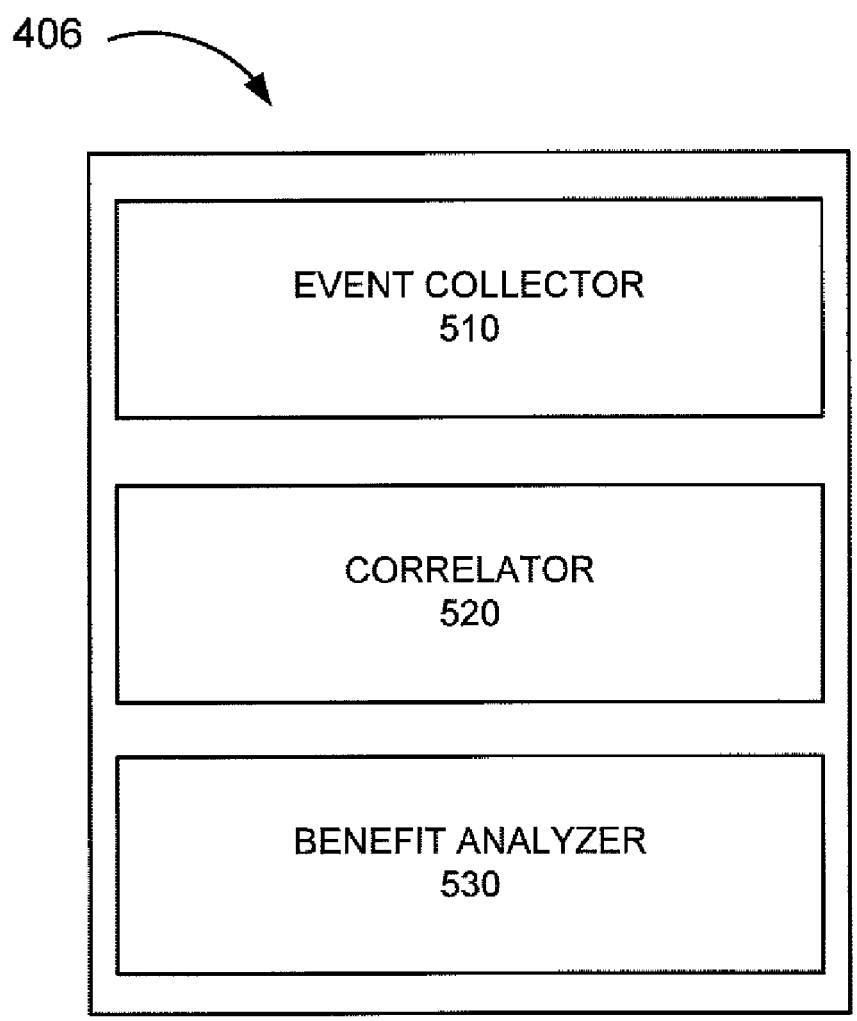
FIG. 5 is a diagram of exemplary components associated with the prediction application depicted in FIG. 4.

FIG. 5 is a diagram of exemplary components associated with prediction application 406 depicted in FIG. 4. As illustrated, prediction application 406 may include an event collector 510, a correlator 520, and a benefit analyzer 530. For purposes of discussion, the components of prediction application 406 will be described in relation to appliance 230 being a router.

Event collector 510 may include a component that identifies an event and collects information associated with the event. In the context of a router, an event may include receipt of a packet. The term "packet," as used herein, is intended to be broadly interpreted to include a datagram, a frame, a cell, or any other type of delivery unit or mechanism. Additionally, or alternatively, an event may be based on information taken on a command line interface (CLI). Event collector 510 may also monitor the state of HDD 404 (e.g., spin-up, spin, and spin-down states).

The type of information that event collector 510 may collect may depend on the type of event. For example, in relation to receipt of a packet, event collector 510 may identify the type of packet, when it is received, and/or other information included in the packet. Thus, event collector 510 may inspect at least a portion of the packet, if not the entire packet, to identify information associated with the packet and corresponding event.

As an aside, most routers may not require HDD 404 access to forward a packet, since accessing HDD 404 may result in latency. However, there may be exceptions. For example, HDD 404 access may result when the network topology changes or when security measures may be performed on the packet. In other words, in practice, packets that may trigger HDD 404 access may relate to the control plane, such as control and management packets, rather than packets relating to forwarding customer traffic.

Depending on the network model, control and management packets may be received by a router on a separate and/or dedicated connection compared to packets associated with customer traffic. Additionally, or alternatively, a router may include separate components designed to process control and management packets compared to packets relating to customer traffic. Examples of control and management packets utilized by, for example, network operators and/or system administrators, may include packets to gather statistical information, packets to configure the router, packets to maintain the router, etc. In some instances, control and management packets may be sent to a router according to a regular schedule.

Despite these considerations, the concepts described herein in relation to event collector 510 may be applied to any type of event, regardless of whether the event involves a packet, a certain type of packet, and/or no packet at all. In this regard, implementations may vary depending on, for example, the type of device and/or the type of events.

Correlator 520 may include a component that calculates a relationship between events. For example, correlator 520 may determine a correlation between an event, such as receiving a packet, and another event, such as HDD 404 access. Correlator 520 may determine a correlation between events collected and/or stored by event collector 510.

In one implementation, correlator 520 may employ the Pearson correlation model. Additionally, or alternatively, correlator 520 may employ biserial correlation and/or regression analysis. For example, depending on the value of, for example, a correlation coefficient, correlator 520 may determine that a correlation exists. In another implementation, correlator 520 may consider a correlation to exist based on a confidence factor. The confidence factor may be calculated by determining a variance between HDD 404 wake-up time and the occurrence of the event, such as receiving a packet. If the variance is below a threshold value, correlator 520 may assume that a correlation exists. The confidence value may also be based on previous occurrences of the event and corresponding behavior of HDD 404. Correlator 520 may evaluate this information to determine whether the past behavior reinforces or does not reinforce the confidence value.

Correlator 520 may, for example, identify an event that may trigger, for example, access to HDD 404. In such an instance, correlator 520 may provide, for example, a wake-ahead request or a continue-to-spin request to benefit analyzer 530 when the event occurs. For example, when a packet is received by appliance 230, there may be an interval of time between the receipt of the packet and when HDD 404 should begin to spin-up. In such a case, correlator 520 may provide a wake-ahead request to benefit analyzer 530 when the packet is received. Additionally, or alternatively, if an event occurs, for example, in a periodic manner, correlator 520 may provide a wake-ahead request to benefit analyzer 530 before the event occurs.

Benefit analyzer 530 may include a component that determines whether to maintain or alter a state of HDD 404 based on correlator 520 and one or more parameters associated with HDD 404, such as parameters associated with the life of HDD 404. That is, benefit analyzer 530 may weigh the life of HDD 404 against the performance improvement of, for example, a wake-ahead request. In the instances that benefit analyzer 530 determines that the performance improvement may outweigh the life of HDD 404, benefit analyzer 530 may permit a predictive action provided by correlator 520 for HDD 404. However, in the instances that benefit analyzer 530 determines that the life of HDD 404 may outweigh the performance improvement; benefit analyzer 530 may prevent the predictive action of correlator 520 for HDD 404.

Benefit analyzer 530 may consider the life of HDD 404 based on numerous variables associated with the operation of HDD 404. For example, the variables may include the age of HDD 404, the model and make of HDD 404, the total operating time of HDD 404, the frequency of spin-up and spin-down states, the interval of time for each state of HDD 404, a total time for each state of HDD 404, and/or other activity profile information. In one implementation, each variable may include a corresponding weighting factor. Benefit analyzer 530 may consider these variables and corresponding weighting factors to assess the life of HDD 404.

Benefit analyzer 530 may also consider the performance improvement associated with HDD 404 according to correlator 520. While operating HDD 404 based on correlator 520 may result in an improvement of performance, a degree of improvement may vary depending on, for example, the event. That is, for example, a wake-ahead request for one event may not yield the same performance improvement compared to a wake-ahead for another event, even though for both events the same action may be taken with respect to HDD 404. Thus, in one implementation, a measure of performance improvement may be based on the event. For example, an event may be assigned a level of importance based on, for example, a network operator's preference and/or guidelines. In such an instance, a packet may include one or more bits indicating a level of importance. This type of information may be detected by event collector 510 and/or utilized by benefit analyzer 530.

Additionally, or alternatively, a measure of improvement may be based on, for example, the load on appliance 230. For example, if the load on appliance 230 is significantly high and HDD 404 is frequently being accessed, the improvement in performance may be determined to be relatively low.

Although FIG. 5 illustrates exemplary components, in other implementations, fewer, additional, or different components may be utilized.

Figure 6:
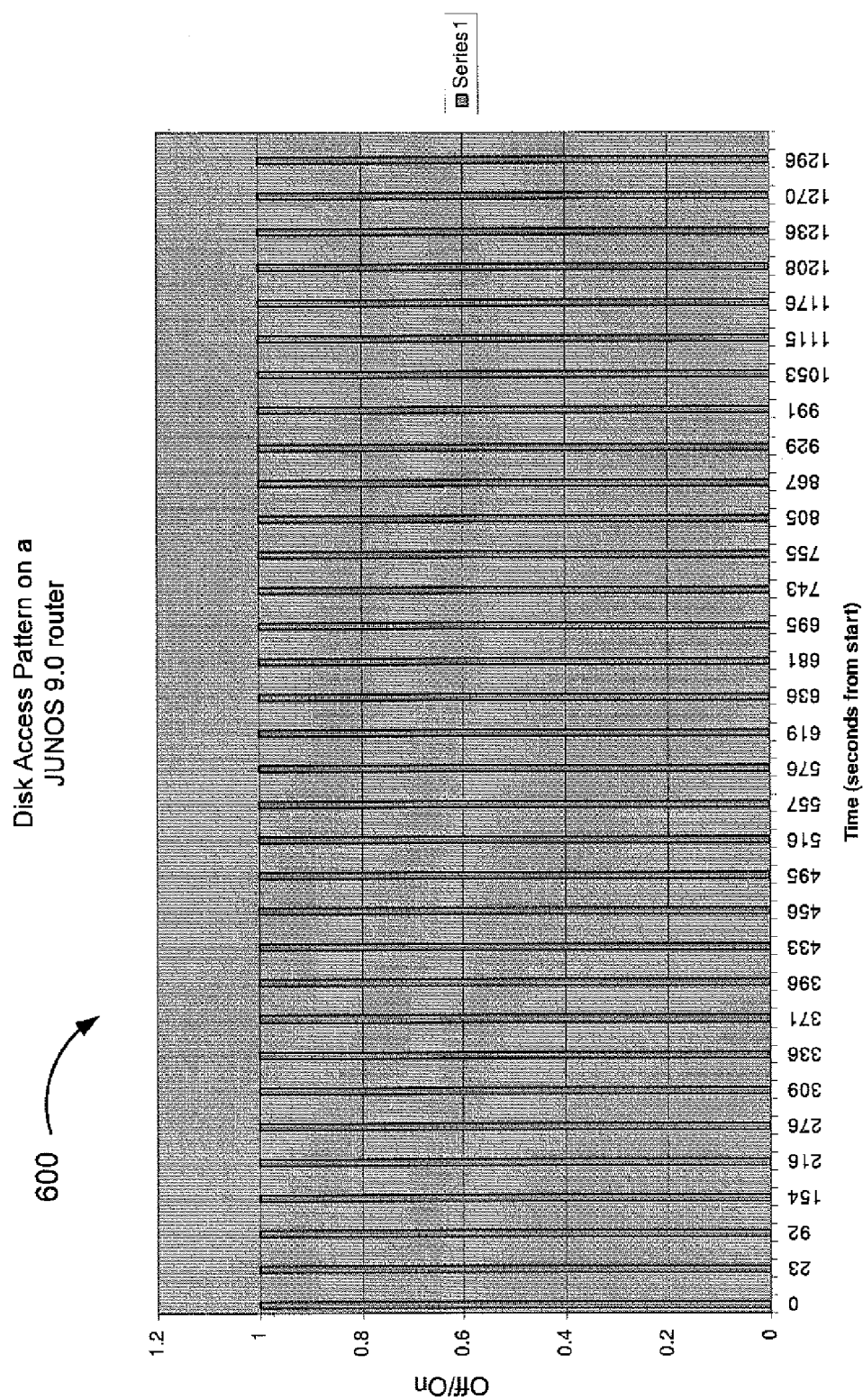
FIG. 6 is a graph illustrating a disk access pattern of an appliance.

FIG. 6 is a graph illustrating a disk access pattern of an appliance. As illustrated, graph 600 represents a disk access pattern on a JUNOS 9.0 router residing in a laboratory testbed. A measuring tool was employed to measure disk access behavior. The horizontal axis of graph 600 indicates time in seconds and the vertical axis of graph 600 represents an off/on state of the disk, where zero represents an "off" state and one (1) represents an "on" state. The events that triggered the disk accesses may be any conventional events that trigger disk access.

As indicated in graph 600, disk access began to occur at 0 seconds, 23 seconds, 92 seconds, 154 seconds, etc. Further, graph 600 illustrates that the time period or duration of each disk access is approximately 11 seconds. So, for example, from 23 seconds to 34 seconds HDD 404 maintained a spin state, and at 34 seconds HDD 404 returned to a no-spin state. Although not illustrated in graph 600, the underlying data revealed that the spin-up time of HDD 404 was approximately 2 seconds. So, for example, at 21 seconds, HDD 404 may have begun to spin-up from a no-spin state.

The data represented by graph 600 remained fairly consistent with regard to spin-up state periods (i.e., approximately 2 seconds) and disk access periods (i.e., approximately 11 seconds). Additionally, the intervals of time at which disk access began (i.e., at 23 seconds, 92 seconds, etc.) exhibit some degree of periodicity. Based on these observations, it may be concluded that prediction application 406 may improve the performance and life of such a router given the activity profile of HDD 404, as described herein.

Exemplary Process

Figure 7:
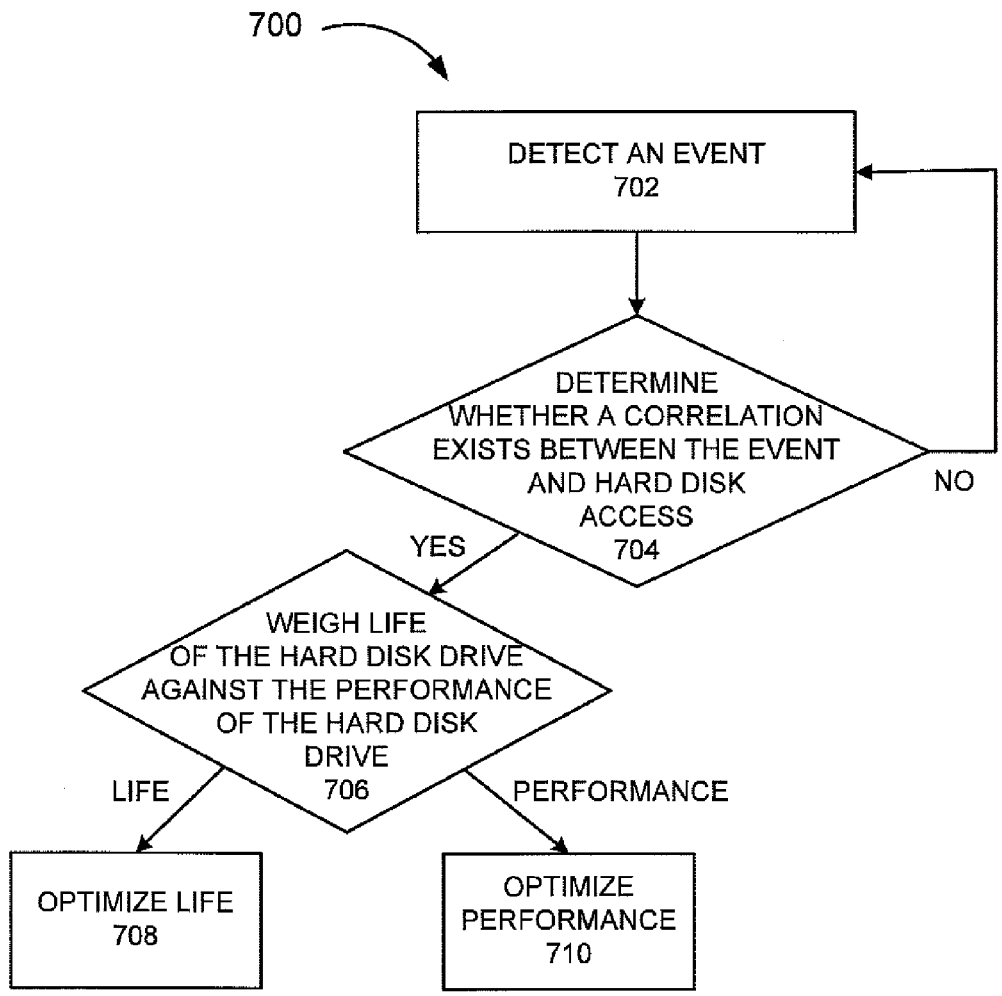
FIG. 7 is a flow chart illustrating an exemplary process for the prediction application depicted in FIG. 4.

FIG. 7 is a flow chart illustrating an exemplary process for prediction application 406 depicted in FIG. 4. Exemplary process 700 may begin with detecting an event (Block 702). In one implementation, event collector 510 may detect an event associated with a device, such as appliance 230. An event may include receipt of a packet. For example, the packet may be a control packet that may trigger a script session. Event collector 510 may inspect one or more portions of the packet and identify information associated with the event. In other instances, an event may be based on information taken on a CLI. Event collector 510 may also monitor state information of HDD 404 (e.g., spin-up, spin, or spin-down states). For example, event collector 510 may identify a spin-up state based on when HDD 404 may begin to spin from an at rest state to achieve a spin state of the hard disk. Also, event collector 510 may identify a spin state based on when information is being read or written. Further, event collector 510 may identify a spin-down state based on when HDD 404 may begin to spin down from a spin state to an at rest state.

In Block 704, a determination may be made as to whether a correlation exists between the event and hard disk access. In one implementation, correlator 520 may calculate a correlation coefficient that may represent a degree of relatedness between the occurrence of the event and hard disk access. The correlation coefficient may be based on, for example, a Pearson correlation model, a biserial correlation model, and/or regression analysis. For example, if the correlation coefficient is equal to zero and/or below a threshold value (i.e., that the event is uncorrelated) (Block 704—No), the process may return to Block 702. However, if the correlation coefficient is greater than a threshold value (i.e., that a correlation exists) (Block 704—Yes), correlator 520 may provide benefit analyzer 530 with a HDD operation request (Block 706). For example, a HDD operation request may include a wake-ahead request. A wake-ahead request may include, for example, a request for HDD 404 to spin-up HDD 404 from an at rest state before hard disk access may be needed.

In another implementation, a correlation may be determined based on a confidence factor. The confidence factor may be calculated by determining a variance between HDD 404 wakeup time and the occurrence of the event. If the variance is below a threshold value (Block 704—Yes), correlator 520 may assume that a correlation exists and provide benefit analyzer 530 with a HDD operation request (Block 706). However, if the variance is not below a threshold value (Block 704—No), correlator 520 may determine that no correlation exists, and the process may return to Block 702.

In Block 706, the life of HDD 404 may be weighed against the performance of HDD 404. As previously described herein, benefit analyzer 530 may control the state of HDD 404 based on correlator 520 and variables associated with the life of HDD 404. If benefit analyzer 530 determines that the life of HDD 404 outweighs the performance gains associated with executing the wake-ahead operation for HDD 404 (Block 706—Life), then in Block 708, benefit analyzer 530 may control the state of HDD 404 in a way that optimizes the life of 708. For example, benefit analyzer 530 may determine that a wake-ahead operation may not be employed. However, if benefit analyzer 530 determines that the performance gains associated with the wake-ahead operation for HDD 404 outweighs the life of HDD 404 (Block 706—Performance), then in Block 710, benefit analyzer 530 may control the state of HDD 404 in way that optimizes the performance of HDD 404. For example, benefit analyzer 530 may determine that a wake-ahead operation may be employed. In such an instance, benefit analyzer 530 may issue, for example, the wake-ahead request to HDC 402, which in turn, may control HDD 404 in accordance with the wake-ahead request. That is, HDD 404 may begin to spin-up.

Although FIG. 7 illustrates an exemplary process, in other implementations, fewer, additional, or different processes may be employed.

EXAMPLES

Figure 8A:
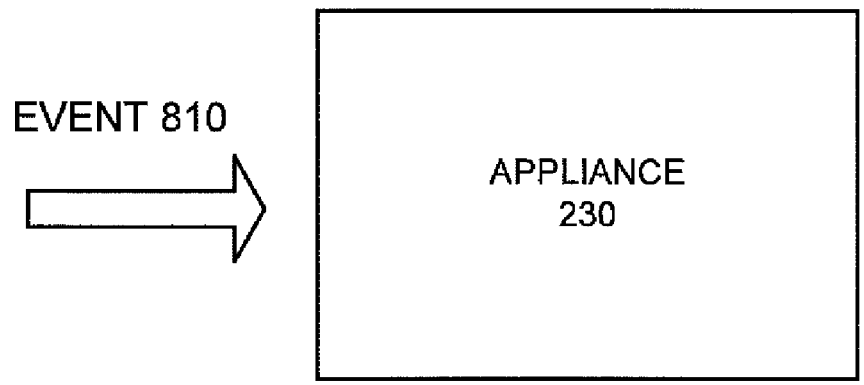
FIGS. 8A and 8B are diagrams illustrating examples corresponding to the concepts described herein.
Figure 8B:
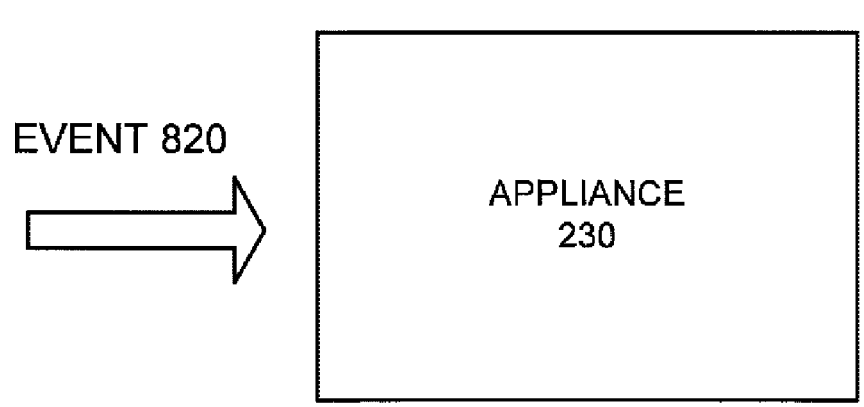

FIGS. 8A and 8B are diagrams illustrating examples corresponding to the concepts described herein. As illustrated in FIG. 8A, appliance 230 may receive a control packet corresponding to an event 810. In this scenario, a network operator may transmit a control data-packet that triggers a system tool. The system tool may collect resource usage information (e.g., history logs) that may be written to hard disk and/or may be too large to store in memory 304, such as RAM. The system tool may be implemented during the evening time, and may provide the resource usage information to the network operator the following morning. In this regard, benefit analyzer 530 may determine that there is no benefit in optimizing performance of HDD 404, despite a HDD operation request from correlator 520, since the expediency in which the resource usage information may be provided to the network operator may be inconsequential.

As illustrated in FIG. 8B, appliance 230 may receive a control packet corresponding to an event 820. In this scenario, a network operator may transmit a control packet that triggers a performance evaluation application. The performance evaluation application may determine performance statistics associated with appliance 230. In this regard, benefit analyzer 530 may determine that there is a benefit in optimizing performance of HDD 404, since the performance of HDD 404 relates to the performance of appliance 230, which in turn relates to the performance statistics that may be collected by the performance evaluation application.

Conclusion

The foregoing description of implementations provides an illustration, but is not intended to be exhaustive or to limit the implementations to the precise form disclosed. Modifications and variations are possible in light of the above teachings or may be acquired from practice of the teachings. For example, the concepts described herein may apply to any device that may need some lead time to access data or to operate. For example, predication application 406 may be utilized for a printer that may print at periodic intervals. In one implementation, prediction application 406 may pre-warm the printer from a sleep and/or stand-by mode before a printing request may be received. For example, prediction application 406 may maintain a history log of, for example, wake-up times.

Although aspects described herein relate to weighing performance gain against the life of HDD 404, other parameters associated with HDD 404 may be weighed against the performance gain. Further, in some implementations, no weighing of a performance gain against the life of HDD 404 may be performed. Rather, for example, if a performance gain exists, the wake-ahead request may be issued and performed.

In addition, while a series of blocks has been described with regard to the process illustrated in FIG. 7, the order of the blocks may be modified in other implementations. Further, non-dependent blocks may be performed in parallel. Further, it may be possible to omit blocks within the process of FIG. 7. For example, Block 702 may be omitted when an event is periodic.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combination of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a processor to:
    identify a request for a predictive hard disk drive operation associated with a hard drive;
    weigh a first value associated with a performance improvement associated with the hard disk drive if the predictive hard disk drive operation is granted against a second value associated with an improvement in a life of the hard disk drive if the predictive hard disk drive operation is not granted;
    bypass the predictive hard disk drive operation if the second value outweighs the first value; and
    operate the hard disk drive in accordance with the predictive hard disk drive operation if the first value outweighs the second value.

2. The device of claim 1, where the predictive hard disk drive operation includes an event that occurs periodically.

3. The device of claim 1, where the predictive hard disk drive operation includes a wake-ahead request.

4. The device of claim 1, where, when weighing the first value and the second value, the processor is further to:
    calculate the second value based on an age of the hard disk drive.

5. The device of claim 1, where, when weighing the first value and the second value, the processor is further to:
    calculate the second value based on a total operating time of the hard disk drive.

6. The device of claim 1, where, when weighing the first value and the second value, the processor is further to:
    calculate the second value based on an activity profile of the hard disk drive.

7. A method comprising:
    detecting an event;
    calculating a confidence factor based on a variance between a hard disk drive and an occurrence of the event; and
    determining whether the event correlates to access of the hard disk drive based on the confidence factor;
    requesting a wake-ahead of the hard disk drive when the event correlates to access of the hard disk drive;
    weighing a first value of performance improvement if the wake ahead request is granted against a second value of a life of the hard disk drive if the wake ahead request is not granted; and
    waking ahead the hard disk drive if the first value outweighs the second value.

8. The method of claim 7, where detecting the event includes detecting receipt of packets.

9. The method of claim 7, where determining whether the event correlates to access of the hard disk drive includes:
calculating a correlation coefficient representing a degree of relatedness between the event and hard disk access; and
determining whether the event correlates to access of the hard disk drive based on the correlation coefficient.

10. The method of claim 9, further comprising:
determining that the event correlates to access of the hard disk drive when the correlation coefficient is equal to zero.

11. The method of claim 9, further comprising:
determining that the event correlates to access of the hard disk drive when the correlation coefficient is below a particular threshold.

12. The method of claim 7, further comprising:
determining that the event correlates to access of the hard disk drive when the variance is below a threshold value.

13. A computer-readable memory device having stored thereon instructions, executable by at least one processor, the instructions comprising:
one or more instructions that, when executed by the at least one processor, cause the at least one processor to:
detect an event;
calculate a confidence factor based on a variance between a hard disk drive and an occurrence of the event;
determine whether the event correlates to access of the hard disk drive based on the calculated confidence factor;
request a predictive hard disk drive operation when the event correlates to access of the hard disk drive;
weigh a first value associated with a performance improvement if the predictive hard disk drive operation is granted against a second value associated with a life of the hard disk drive if the predictive hard disk drive operation is not granted; and
perform the predictive hard disk drive operation if the performance improvement outweighs the life of the hard disk drive.

14. The computer-readable memory device of claim 13, where the one or more instructions further comprise:
one or more instructions that, when executed by the at least one processor, cause the at least one processor to:
determine a third value associated with a life of the hard disk drive if the predictive hard disk operation is not granted; and
operate the hard disk drive in accordance with the predictive hard disk drive operation if the first value outweighs the third value.

15. The computer-readable memory device of claim 13, where the predictive hard disk drive operation includes a wake-ahead of the hard disk drive.

16. The computer-readable memory device of claim 13, where the one or more instructions to cause the at least one processor determine whether the event correlates to access of the hard disk drive comprise:
one or more instructions that, when executed by the at least one processor, cause the at least one processor to calculate a correlation value between the event and the access to the hard disk drive.

17. The computer-readable memory device of claim 13, where the one or more instructions further comprise:
one or more instructions that, when executed by the at least one processor, cause the at least one processor to calculate the performance improvement based on a type of the event.

18. The computer-readable memory device of claim 13, where the event includes receipt of a packet.

19. The computer-readable memory device of claim 13, where the event includes an event that occurs periodically.

* * * * *